Aug. 28, 1956 W. B. HALEY 2,760,802
OIL SEAL
Filed June 18, 1953
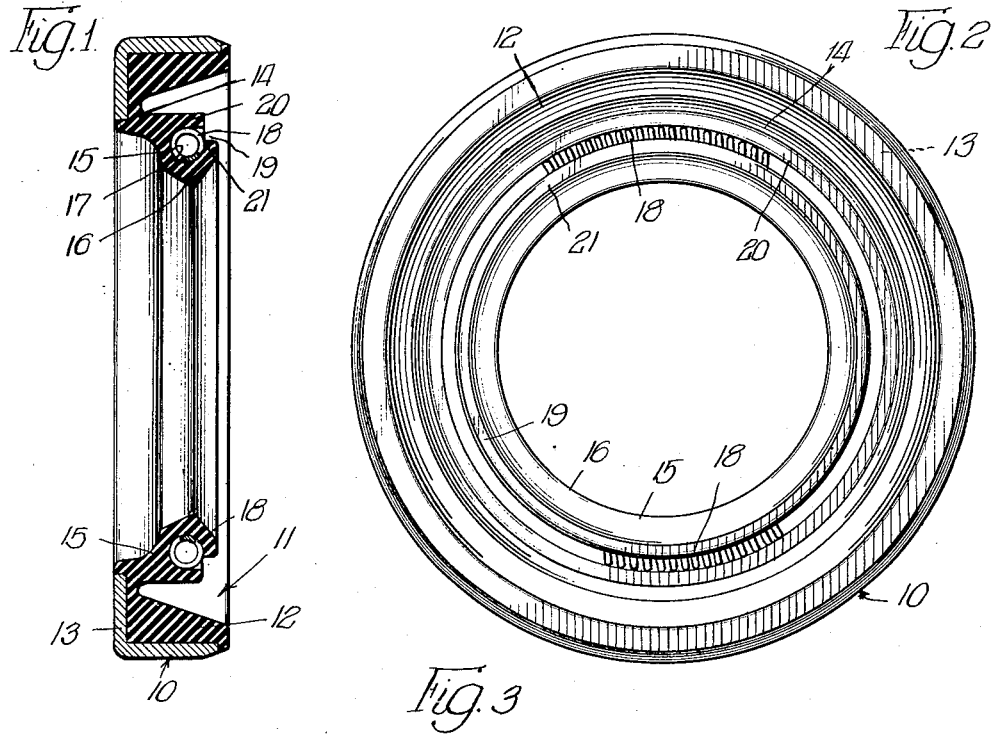
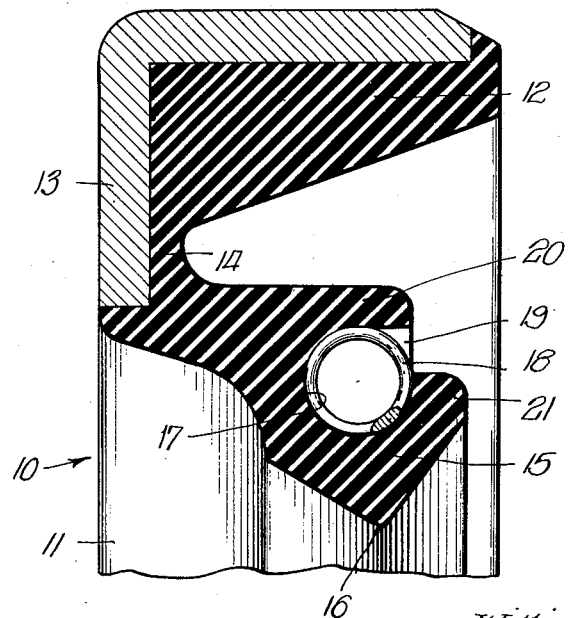
INVENTOR.
William B. Haley,
BY
Cromwell, Greist & Warden
Attys

United States Patent Office 2,760,802
Patented Aug. 28, 1956

2,760,802
OIL SEAL

William B. Haley, Prospect Heights, Ill., assignor to Chicago Rawhide Manufacturing Company, Chicago, Ill., a corporation of Illinois Application June 18, 1953, Serial No. 362,589

1 Claim. (Cl. 288—3)

The present invention relates to an improved radial oil seal. Although the features thereof are suitable for incorporation in practically all sizes of seal to prevent escape of oil or entry of dirt or foreign matter in relation to a pair of coaxial, relatively movable machine parts, the improvement has particular utility in large size heavy duty installations.

The invention particularly concerns a radial type seal in which a garter spring is employed to radially constrict a resilient, synthetic rubber sealing element or lip against a shaft. Considerable difficulty has been experienced in seals of this type in regard to a tendency of the garter spring to leave its intended seat in a lip-bearing member which it radially constricts.

It is therefore an object of the invention to provide an improved, garter spring type, radial oil seal featuring a sealing member having an integral peripheral sealing lip and being provided with an annular groove outwardly of the lip which opens axially through a considerably restricted annular throat, an endless annular coil spring, or garter spring being disposed in the groove. Certain portions of the sealing member which externally define the groove are readily flexed apart to conveniently receive the coiled spring, and thereafter hold the latter in place in the groove, yet without gripping the spring sufficiently tightly to materially impede its freeness of springing action.

A further object is to provide a radial seal of the sort described in the preceding paragraph in which a mounting member is formed integral with the sealing member, and in which a web integrally connecting the sealing member to the body portion extends in a generally axial direction, thus affording desired resilience of action of the sealing member in opposition or assistance to the constrictive force of the garter spring which urges the same.

In the drawings:

Fig. 1 is a view in axial section through a seal in accordance with the invention;

Fig. 2 is a view of the seal in end elevation, as viewed from the right of Fig. 1; and Fig. 3 is a fragmentary axial sectional view of the seal, in considerably enlarged scale, more clearly illustrating the relationship of the component parts of the same.

The seal of the invention, designated 10, comprises a one-piece annulus 11 of rubber, synthetic rubber or the like which is molded to provide an outer, relatively thick body portion 12. A rigid metal housing mounting ring or shell 13 of L-shaped cross section may be externally bonded to portion 12, the radial and axially extending portions of the shell rigidly confining the resilient body and affording a means for force fitting the seal into a part to be sealed, such as a shaft housing bore.

The body portion 12 of the seal is integrally connected by means of an annular web 14 with a radially extending sealing member 15 which is of relatively thick, block-like character, as compared with the connecting web. This web extends in a generally axial direction; accordingly, a desired degree of flexibility is afforded for a yieldable, cantilever type radial engagement of an inner shaped sealing lip 16 on member 15 with a relatively movable member to be sealed, such as a shaft concentric with seal 10.

Sealing member 15 is molded to provide an annular internal groove 17 of circular cross section, in which a coil garter spring 18 is disposed. The diameter of groove 17 is such that the garter spring is relatively freely received therein, i. e., the groove does not pinch and bind the spring, and thus interfere with its freedom of flexure, or cause its flexing action to be non-uniform along the circumferential length of the spring.

Spring 18 is almost entirely enclosed within groove 17. The latter opens sidewise and axially through a restricted annular channel or throat 19, defined by an upper horizontal, axially extending integral tube-like lip or flap 20 and a radially and outwardly projecting lip 21 conforming to the shape of the spring coils. Groove lips 20, 21 are readily flexed apart to enlarge throat 19 and permit garter spring 18 to be slipped into groove 17. They exert effective retaining action on the spring to facilitate its progressive lengthwise feeding into the groove, and when the spring is in place the lips prevent its inadvertent dislodgement from the groove, without however, exerting an undue cramping grip on the spring. The spring is removed from the groove just as readily as it is inserted therein simply by deflecting one or both of the integral lip extensions 20, 21 of the member 15. The outer surface of the lip 20 is spaced substantially inwardly of the inner surface of the mounting or body portion 12 to permit substantial distention of the free end of the lip without interference from the mounting portion.

I claim:

In an oil seal, an outer mounting portion for engagement with a bore in a housing about a centrally located shaft, an inner sealing portion spaced inwardly a substantial distance with respect to the outer mounting portion, a flexible neck portion hingedly connecting the inner sealing portion at a point adjacent one of its ends to the outer mounting portion, a sealing lip formed on the inner surface of the inner sealing portion adjacent the free end of the latter for sealing coaction with the shaft, a groove formed in the inner sealing portion radially outwardly of the sealing lip for the reception of a lip constricting spring, and an axially extending tube-like flap formed on the inner sealing portion as an integral part of the latter independent of the neck portion and merging with the neck portion, and positioned with its outer surface spaced inwardly a substantial distance from the inner surface of the outer mounting portion to permit substantial distention of the free end of the flap without interference from the mounting portion, and extending over the groove far enough to form a resricted annular throat through which the spring can be inserted or removed, the flap and sealing portion being adapted to flex as a unit about said neck portion.

References Cited in the file of this patent

UNITED STATES PATENTS

| | | |
|---|---|---|
| 1,740,929 | Loock | Dec. 24, 1929 |
| 2,008,682 | Christensen | July 23, 1935 |
| 2,538,866 | Gilbert | Jan. 23, 1951 |

FOREIGN PATENTS

| | | |
|---|---|---|
| 711,737 | Germany | of 1941 |
| 861,346 | Germany | of 1952 |